Nov. 11, 1969   O. J. STRUGER ET AL   3,478,228
ELECTRICAL CIRCUIT TO PROVIDE PULSE SIGNALS
HAVING PRECISE TIME DURATION
Filed Oct. 21, 1965   2 Sheets-Sheet 2

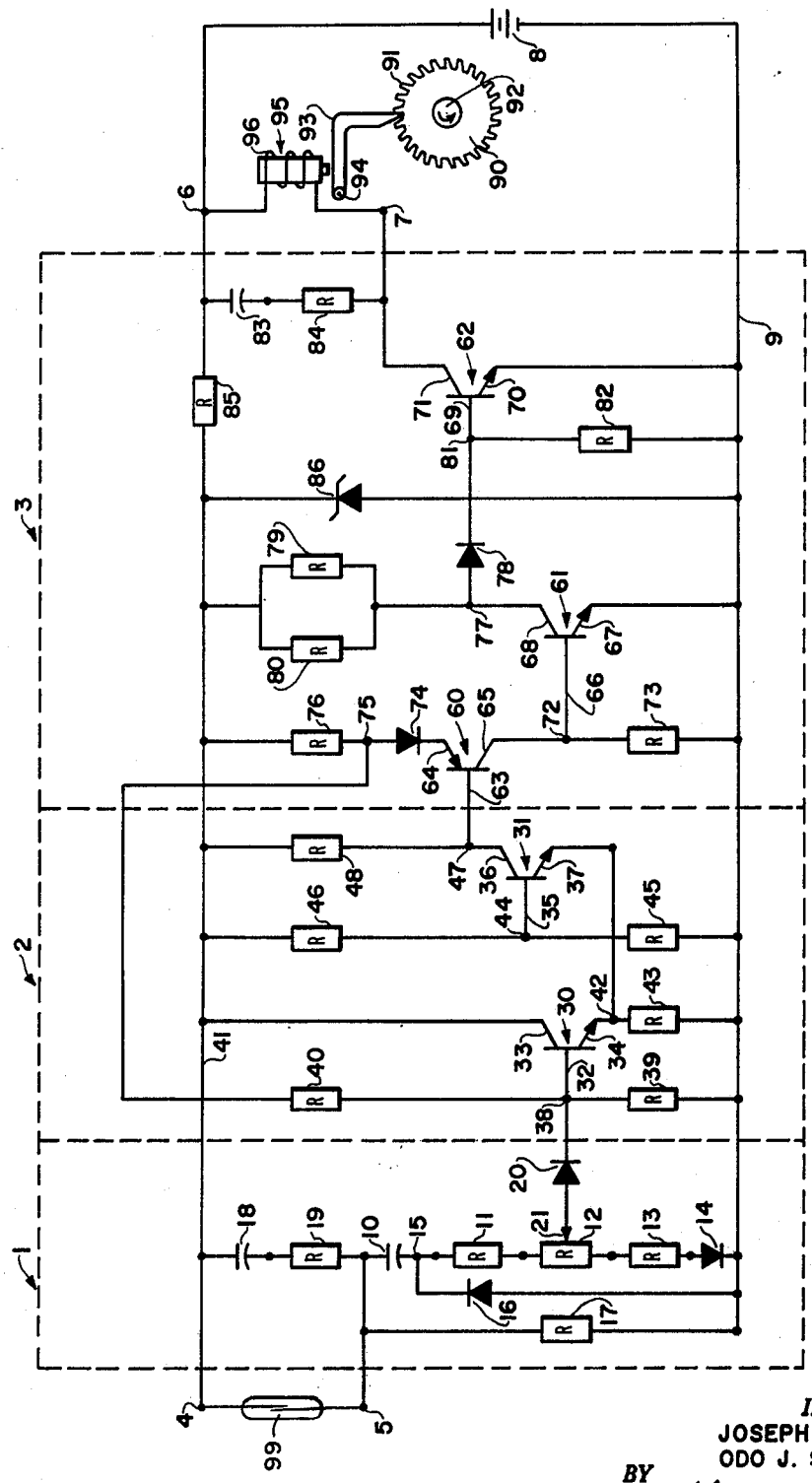

INVENTORS
JOSEPH R. MOSER
ODO J. STRUGER
BY
Thomas C. Schatzel

United States Patent Office 3,478,228
Patented Nov. 11, 1969

3,478,228
ELECTRICAL CIRCUIT TO PROVIDE PULSE SIGNALS HAVING PRECISE TIME DURATION
Odo J. Struger, Milwaukee, and Joseph R. Moser, Brookfield, Wis., assignors to Allen-Bradley Company, Milwaukee, Wis., a corporation of Wisconsin
Filed Oct. 21, 1965, Ser. No. 499,924
Int. Cl. H03k 1/14
U.S. Cl. 307—265
6 Claims

ABSTRACT OF THE DISCLOSURE

A circuit for providing pulse signals having a precise "on" time duration utilizing an RC timing network in which the timed signal to which the trigger network responds is the decreasing voltage across a resistor as the capacitor is charged. The trigger network responds only to a predetermined trigger level provided by the timing network.

---

The present invention relates to a control circuit and more specifically to a control circuit adapted to receive at its input terminals a train of electrical signals and deliver a train of "on-off" electrical pulse signals having a precise "on" time. The control circuit includes a timing network and a trigger network responsive to the timing network. The timing network is adapted to receive the train of input signals, and, in turn, provide a train of exponentially decreasing trigger signals which are received by the trigger network. The trigger network has a predetermined trigger level and provides an output signal for each trigger signal having a magnitude exceeding (more positive in the positive input mode or more negative in the negative input mode) the trigger level. The time duration of the output signal is dependent on the time duration that the magnitude of the corresponding exponentially decreasing trigger signal exceeds the trigger level. Depending on the requirements of the load, the output of the trigger circuit may then be amplified.

There are various electrical loads which for proper operation require electrical signals of precise shape but of which the input signal source carrying the necessary information is of varying shape and time duration and thus unsatisfactory for directly operating the load. For example, the input information may be contained on spikes, pulses of "on" time duration shorter than desired or pulses of "on" time duration longer than desired. Accordingly, it is necessary to incorporate a control circuit capable of receiving the input information and converting it to a control signal capable of precisely operating the load according to the input information.

A common application for such a circuit and an illustrative embodiment used herein is in numerical control systems for machine tools. As is well known, a numerical control system may be viewed as a system adapted for automatic control of the operation of machine tools according to a preselected plan. The information necessary to accomplish the plan may be programmed on the tape according to a code. Numerical control tapes are frequently divided into traverse lines with each line containing a specific character of information. The tape is passed through a tape reader which reads the lines in succession and relays the coded information from the tape to the control system in the form of electrical pulse signals.

Accordingly, there is need for a tape reader drive which advances the tape after each line has been read. Generally, each numerical control system requires a certain amount of time to read a line of inforamtion and a certain amount of time for the drive to advance the tape to another position for reading the succeeding line. Thus, there must be synchronism between the "tape reading" and "tape advancing" operations with the goal of the tape reader and associated drive mechanism being to accurately read the maximum number of lines in a given period of time. The tape reader drive may include an electromechanical clutch mechanism which in turn controls advancement of the tape drive shaft. The clutch operation may be controlled by a circuit receiving a signal after each line is read. The control circuit receives the input signal and provides a signal to the clutch mechanism to allow the tape drive to advance the proper amount so that the next line of information may be read. It may not be necessary that the "on" time duration of the signals to the clutch mechanism be the same as the "on" time of the input signal to the pulse control circuit. For example, the clutch mechanism may employ a solenoid. The solenoid responds to the output pulse and controls the mechanical operation. The time duration of the solenoid operation is generally short compared to the time required for the mechanical operation, both operations of which must be performed during one cycle of input signal to the control circuit. However, too long an "on" period may cause the tape drive mechanism to advance too far thereby missing lines—too short a signal may not permit the drive mechanism to advance and read the next line. Also, as demands for higher speed drives increase, the need for precise control increases. The control circuit of the present system may be incorporated in such embodiments and will provide a controlled output signal so that the tape is precisely advanced to the proper position at a rapid rate.

Accordingly, an object of the present invention is to provide an improved control circuit which will provide an electrical signal of desired shape while receiving an input signal of undesired shape.

Another object of the present invention is to provide an improved control circuit which is useful for applications where a trigger effect is desired to operate a control device and where the relationship of the "on-off" periods is required to be consistent and precise.

Another object of the present invention is to provide a control circuit which is useful for applications where a train of input pulse signals having a predetermined repetition rate need be converted to a train of "on-off" pulses of the same repetition rate and having a precise "on" time period.

Another object of the present invention is to provide a control circuit which is useful for controlling an electromechanical tape reader drive for numerically controlled machine tools.

Another object of the present invention is to provide a control circuit which maintains stable operation during variations in temperature.

The foregoing and other objects will appear in the description to follow. In the description, reference is made to the accompanying drawings which form a part hereof and show by way of illustration a specific embodiment for practicing this invention. This embodiment will be described in sufficient detail to enable those skilled in the art to practice the invention, but it is to be understood that other embodiments of the invention may be used and that changes may be made in the embodiment without deviating from the scope of the invention. Consequently, the following detailed description is not to be taken in a limiting sense; instead the scope of the present invention is best defined by the appended claims.

In the drawings:

FIG. 1 illustrates a solid state control circuit incorporating the principles of the present invention and adapted for controlling a tape reader drive system of a machine tool numerical control system.

Figure 1A:
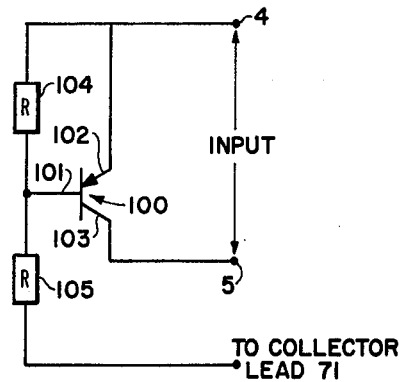
FIG. 1A illustrates a wiring diagram of a circuit which may be inserted across the input terminals of the circuit of FIG. 1 when the "on" time period of input signals is of a shorter time duration than the desired "on" time period of output signal.

The control circuit of FIG. 1 may be viewed as including three main section illustrated herein by three broken-line blocks: a resistance-capacitance, charge-discharge timing network, referred to by the general reference character 1; a trigger network referred to by the general reference character 2; and a direct coupled switching amplifier referred to by the general reference character 3. The control circuit further includes a pair of input terminals 4 and 5, a pair of output terminals 6 and 7 and a D.C. voltage supply source 8 connected between the output terminal 6 and a common ground terminal 9.

The timing network 1 includes an energy storage device in the form of a capacitor 10, a fixed resistive element 11, a variable resistive element 12, a fixed resistor element 13 and a diode 14. The capacitive element 10 is connected in series with the input terminal 5 and a junction point 15 common to the series connection of the resistors 11, 12 and 13. The anode of the diode 14 is connected to the resistor 13 and the cathode of the diode 14 is connected to the common ground terminal 9. Parallel between the junction 15 and the common ground 9 is a diode 16 with the cathode common with the junction 15. Also, between the input terminal 5 and the ground terminal 9 is a resistor 17. Across the input terminals 4 and 5 is a capacitor 18 and a resistive element 19 connected in series. Completing the circuitry of the timing network 1 is a diode 20 having an anode connected to a wiper arm 21 of the variable resistor 12.

The trigger network 2 includes a pair of control valves in the form of NPN transistors, respectively referred to by the general reference characters 30 and 31. The transistor 30 has a base lead 32, a collector lead 33 and an emitter lead 34. The transistor 31 has a base lead 35, a collector lead 36 and an emitter lead 37. The base lead 32 of the transistor 30 is connected to a junction 38 which is common to the cathode of the diode 20, a fixed resistor 39 and a fixed resistor 40. The fixed resistor 39 also joins the ground terminal 9 and serves as a bias resistor to the transistor 30. The collector 33 of the transistor 30 is connected to a junction 41 which is common to the input terminal 4. The emitter 34 of the transistor 30 is connected to a junction 42 which is common to one terminal of a resistor 43 and to the emitter 37 of the transistor 31. The other terminal of the resistor 43 joins the ground terminal 9. The base 35 of the transistor 31 is connected to a junction 44 which is common to a resistor 45 and a resistor 46. The opposing terminal of the resistor 45 is common to the ground terminal 9 and serves as a bias resistor for the transistor 31. The other terminal of the resistor 46 is common to the terminal 41. The collector 36 of the transistor 31 joins a junction 47 which is common to a resistor 48. The resistor 48 also joins the terminal 41 thus completing the circuitry of trigger network 2.

The direct coupled switching amplifier 3 includes a control valve in the form of a PNP transistor referred to by the general reference character 60, a control valve in the form of a NPN transistor referred to by the general reference character 61 and a control valve in the form of a NPN transistor, referred to by the general reference character 62. The transistor 60 has a base lead 63, an emitter lead 64 and a collector lead 65. The transistor 61 has a base lead 66, an emitter lead 67 and a collector lead 68. The transistor 62 has a base lead 69, an emitter lead 70 and a collector lead 71. The base 63 of the transistor 60 is common to the junction 47. The collector 65 joins a junction 72 common to the base 66 of the transistor 61 and one terminal of a resistor 73. The opposing terminal of the resistor 73 joins the ground electrode 9. The emitter 64 of the transistor 60 is connected to the cathode of a diode element 74. The anode of the diode element 74 joins a junction 75 common to the other terminal of the resistor 40 and one terminal of a resistor 76. The other terminal of the resistor 76 is common to the terminal 41. The emitter 67 of the transistor 61 is tied directly to the ground terminal 9, while the collector 68 is tied to a junction 77 which is common to the anode of a diode 78, a fixed resistor 79 and a fixed resistor 80. The other terminals of the resistors 79 and 80 are connected in common to the terminal 41 and also extend to the output terminal 6. The base 69 of the transistor 62 is connected to a terminal 81 which is common to the cathode of the diode 78 and a resistor 82. The other terminal of the resistor 82 joins the ground terminal 9. The emitter 70 of the transistor 62 is tied directly to the ground terminal 9 while the collector 71 is tied directly to the output terminal 7. Parallel to the output terminals 6 and 7 is the series combination of a capacitor 83 and a resistor 84. In series with the output terminal 6 and the common terminal 41 is a fixed resistive element 85. Completing the circuitry of FIG. 1 is a voltage-regulating Zener diode 86 connected across the input terminal 4 and the ground terminal 9.

The load of the illustrated embodiment is shown as including part of a tape reader drive for a numerical control system for machine tools. The load includes a gear 90 with a plurality of teeth 91 mounted on a drive shaft 92. Advancement of the gear 90 is controlled by engagement between the teeth 91 and a pawl 93 mounted on a pivot point 94. Engagement of the pawl 93 is controlled by a solenoid 95 carrying an energizing coil 96 connected across the output terminals 6 and 7.

Operation of the circuitry of FIG. 1 is believed to be as hereinafter set forth. Assume that a train of pulse signals is received across the input terminals 4 and 5. Each pulse may have "on" time periods analogous to that illustrated by the single-cycle diagram 200 in FIG. 2. The diagram 200 illustrates the "on" time as being a fraction $T_1$ of the total time period T. The pulses may be the result of a switch such as a reed switch 99 connected directly across the input terminals 4 and 5 of which the opening and closing of the switch contacts is controlled. Control of the switch contacts controls application of the voltage source 8 in series with the timing network 1. To smooth out any possible spurious pulses resulting from bouncing of the switch contacts, the capacitor 18 and the resistor 19 are connected across the input terminals 4 and 5.

Figure 3:
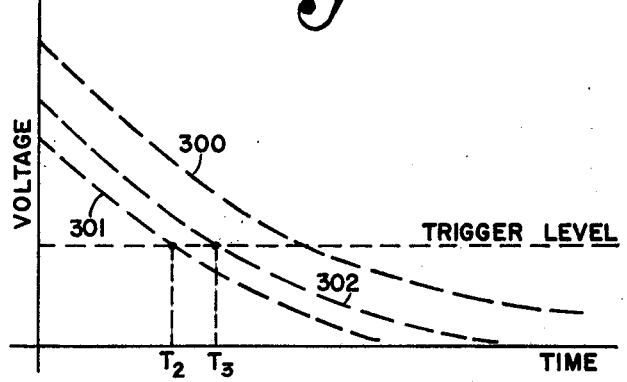
FIG. 3 illustrates a voltage versus time diagram of the voltage signals supplied by the timing circuit to the trigger circuitry of the control circuit of FIG. 1.

The capacitor 10, resistors 11, 12 and 13, diode 14 and ground terminal 9 provide a series resistance-capacitance charge circuit for the input signals during the "on" period, A charge current, according to the equation:

$$i_c = \frac{V_z}{R} e^{-\frac{t}{RC}}$$

where $i_c$ represents the charge current, $V_z$ represents the regulated voltage across the voltage regulator 86, and R represents the total resistance of the charge circuit of the diode 14, though generally the diode 14 may be assumed to be ideal. The voltage across R decays exponentially and assumes a shape similar to that of the charge current $i_c$ and is shown in FIG. 3 by the curve 300 with the time constant of the charge circuit being determined by the RC product. The voltage between the cathode of the diode 20 and the ground terminal 9, hereafter referred to as the trigger signal, is similar in shape of the voltage 300, but of a magnitude dependent upon the position of the wiper arm 21. As illustrated by the dashed line curves 301 and 302, the magnitude of the trigger signal varies with the wiper arm position.

Figure 2:
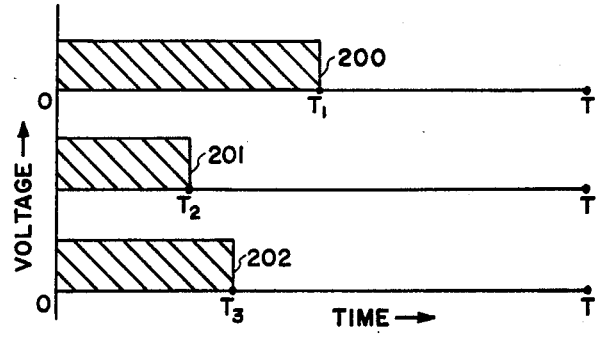
FIG. 2 illustrates various voltage versus time diagrams of input pulse signals and output pulse signals of the control circuit of FIG. 1.

The trigger network 2 is designed to have a constant trigger level. For trigger signals above the trigger level, the network conducts providing an "on" output signal. For trigger signals less than the trigger level, there is no conduction and the output signal appears as "off." Thus, the time required for the trigger signal voltage of the timing network to decay below the trigger level determines the conducting period of the trigger circuit 2 and since the setting of the wiper arm 21 determines the level of the trigger signal, conduction can be set to any desired "on" time duration by the variable resistor 12. For example, the curve 201 of FIG. 2 illustrates a single cycle of the output signal across the terminals 6 and 7 when the wiper arm 21 is set for trigger network conduction during a time period $T_2$ for each signal across the input terminals 4 and 5. The curve 301 of FIG. 3 illustrates the voltage versus time between the anode of the diode 20 and the ground terminal 9 for such operation. It may be noted that the arm 21 is set such that the exponentially decreasing trigger signal coincides with the trigger level at time $T_2$. The curve 202 of FIG. 2 illustrates a single cycle of output signal when the wiper arm 21 is set for trigger circuit conduction during a time period $T_3$ and the curve 302 of FIG. 3 illustrates the potential across the anode of the diode 20 and ground terminal 9 for such operation.

Once the magnitude of the trigger signal decays below the trigger level, such that the transistor 30 ceases to conduct, it is necessary to substantially completely discharge the capacitor 10 so that it is "reset" and in position to receive a succeeding input pulse. Accordingly, the resistor 17 and diode 16 provide a discharge path for the capacitor 10. The connection is such that when current flows through the input terminals 4 and 5, the diode 16 is reverse biased, and when current ceases, the diode permits discharge. The time constant of the discharge cycle is determined by the product value of the resistor 17 and capacitor 10. This value should be selected so that discharge is realized prior to receiving the succeeding "on" pulse.

The trigger circuit 2 is designed to provide an output train of pulses having a precise "on" time duration to the amplifier circuitry 3, which in turn, amplifies the signal train. The transistors 30 and 31 are such that when the transistor 30 is not conducting, the transistor 31 conducts. This means that the transistor 31 conducts whenever there is no input signal to the input terminals 4 and 5 or when the trigger signal is less than the trigger level. During conduction by the transistor 31, there is no output signal from the amplifying network 3. The current to the base 63 of the transistor 60 puts the transistor 60 into conduction causing the transistor 61 to conduct. Conduction of transistor 61 grounds the base 69 of the transistor 62 thereby rendering transistor 62 nonconductive. With the transistor 62 in the "off" state, no signal across the output terminals 6 and 7 is generated. When the trigger signal between the cathode of diode 20 and ground 9 exceeds the trigger level, the input transistor 30 conducts thereby turning the transistors 31, 60 and 61 off. This then puts the transistor 62, which serves as a power output stage, in a forward-biased condition. Transistor 62 then conducts. The transistor 62 acts like a switch with the precise conduction period determined by the conduction period of the transistor 30 in the trigger network. During conduction of transistor 62, an "on" signal is generated across the output terminals 6 and 7.

In the illustration of FIG. 1, the solenoid coil 96 receives the generated "on" pulse. The solenoid attracts the pawl 93 thereby permitting drive shaft 92 to advance the gear 90. The time duration of the "on" pulse must be precise so that advancement of the tape is the desired amount. For example, advancement of one tooth 91 may correspond to one line on a tape. Too short a pulse may not be insufficient to disengage the pawl long enough for the gear to advance one tooth while too long a pulse may cause the gear to advance more than one tooth. By adjusting the wiper arm 21 of the variable resistor 12, the desired duration may be accurately controlled.

The preceding discussion and illustrated embodiment assume that the trigger level of the trigger circuit 2 is set at a positive voltage value. It is also feasible to utilize a trigger circuit having a negative trigger voltage level. In the latter instance, the timing circuit is connected such that the trigger signal decays exponentially from a negative value.

From the preceding discussion, it may be appreciated that the amplitude of the input signal across the input terminals 4 and 5 is a decisive factor in the "on" durations of the output pulse train. Accordingly, the amplitude of the input signals should be regulated for precise output signals. To realize this, the Zener diode 86 regulates the magnitude of the signal across the input terminals 4 and 5. Also, for precise operation, the diode 14 is incorporated to provide temperature compensation and the diodes 20, 74 and 78 to provide stability. The diodes 14 and 20 are connected such that the diode 14 compensates for any potential drop across the diode 20 and change in the base-emitter voltage drop of the transistor 30. For example, if temperature variations result in an increase in the net resistance of the diode 20 and base-emitter junction of the transistor 30, the diode 14 is selected so that it has a substantially corresponding increase so that the voltage between the wiper 21 and terminal 9 is increased.

Up to this point, it has been assumed that the input pulse across the input terminals 4 and 5 has an equivalent or longer "on" time duration than that of the desired output pulse. In the event that the input pulse is of a shorter time duration than the desired output pulse, the circuitry illustrated in FIG. 1A may be incorporated in conjunction with the circuitry of FIG. 1. The circuitry of FIG. 1A is connected across the input terminals 4 and 5. The circuitry includes a current control gate in the form of a PNP transistor represented by the general reference character 100 and having a base lead 101, an emitter lead 102 and a collector lead 103. Between the emitter 102 and the base 101 is a resistor 104. In series with the base 101 is a resistor 105. The opposing terminal of the resistor 105 is tied to the collector 71 of the transistor 62 thereby providing a feedback path from the transistor 62. During operation, the input signal is applied across the input terminals 4 and 5 the same as in FIG. 1. The input signal, in turn, triggers the trigger network 2 and the amplifier network 3 similar to that as previously described. Once the transistor 62, conducts, it provides a feedback pulse to the transistor 100 through the connection of resistor 105 to the collector 71. The feedback signal has no effect on the transistor 100 until the input signal across the input terminals 4 and 5 ceases. Once the input signal across the input terminals 4 and 5 ceases, the electrical relationship between the terminals 4 and 5 is controlled through the transistor 100 and depending on the setting of the wiper arm 21, the trigger circuit 2 conducts for the desired time. After disappearance of the output pulse across the transistor 62, the feedback signal ceases and transistor 100 reverts to the "off" state. Thus, an output signal having a longer "on" time duration than the "on" time of the input is realized.

Figure 1B:
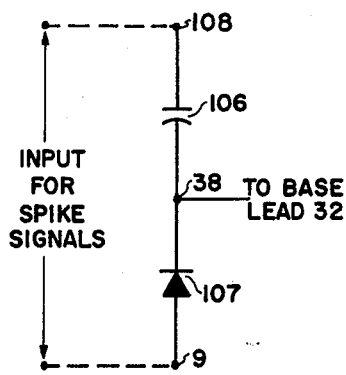
FIG. 1B is a wiring diagram of a circuit which in conjunction with FIG. 1A may be incorporated with the circuit of FIG. 1 when the input signals are in the form of spike voltages.

The circuitry of FIG. 1 may be further modified for operation by trigger spike signals. This may be realized by incorporating the circuitry of FIG. 1B with that of FIGS. 1 and 1A. The circuitry of FIGS. 1 and 1A are connected as above described. In addition, a series combination of a capacitive element 106 and a diode element 107 as shown in FIG. 1B is incorporated. One side of the capacitive element 106 is connected in common to the cathode of the diode 107. The junction of the capacitor 106 and diode 107 is connected in common with the junction 38 which is also common with the base 32 of the transistor 30 and the cathode of the diode 20, as previously discussed. The anode of the diode 107 is connected to the ground terminal 9. The input spike voltage signal is applied across the ground terminal 9 and the other terminal of the capacitor 106 designated 108. The positive spike turns the transistor 30 "on." The trigger circuit 2 and the amplifier 3 are thus actuated so that the transistor 62 conducts in response to the spike signal. As previously described in connection with FIG. 1A, once the transistor 62 conducts, a feedback signal from the collector 71 turns "on" the switching transistor 100. Once the transistor 100 is "on" the time duration of the output signal is determined by the setting of the wiper arm 21 of the resistor 12. The function of the diode 107 is to prevent a reversible voltage spike from reaching the junction of the base 32 and emitter 34 of the transistor 30.

Accordingly, the present invention may be utilized to control an output load device with pulses of precise consistent time duration from input pulses having an "on" time duration longer, shorter or equal to the desired "on" time of the output pulse. Further, by providing a variable resistance element as part of the resistance-capacitance timing circuitry, the duration of the output pulse can be varied.

We claim:

1. A control circuit for providing a train of pulse signals having a precise "on" time duration comprising, in combination:
   (a) a trigger network adapted to receive a train of input trigger signals, the trigger network having a predetermined trigger level and providing a train of "on" output signals, the time duration of the "on" output signals coinciding with the time duration that the magnitude of the trigger signals exceeds the trigger level;
   (b) a timing network adapted to receive a train of input signals and providing a train of trigger signals to said trigger network, the timing network including an electrical charge circuit converting said input signals to a train of exponentially-shaped trigger signals and comprising:
      (1) a capacitive element,
      (2) a first resistive element,
      (3) said capacitive element being charged by said input signals exponentially according to a time constant proportional to the product of the values of the capacitive and first resistive element,
      (4) the train of exponentially-shaped trigger signals appearing across the first resistive element,
      (5) a discharge circuit connected across the capacitive element for discharging the capacitive element after each of said exponentially shaped trigger signals appears across said first resistance element,
   (c) conducting means connecting said timing network to said trigger network so as to conduct only said trigger signals appearing across said first resistive element to said trigger network,
   (d) said trigger signals triggering the trigger network for all values exceeding the trigger level of the trigger network, and
   (e) means for maintaining temperature stability, said means including:
      (1) a first unidirectional conducting device in said charge circuit, the resistance of said first device deviating with temperature such that the magnitude of the trigger signals across the first resistive element varies with temperature, and
      (2) a second unidirectional conducting device integral to said conducting means and establishing a potential drop intermediate the charge circuit and the output of the timing network and receiving the train of trigger signals, the resistance of said second device deviating with temperature at a rate substantially corresponding to that of the first device such that the magnitude of the potential drop of the trigger signal intermediate the timing network and trigger network corresponds to the change in magnitude of the trigger signal across the first resistive element.

2. A solid state control circuit for providing a train of output pulses having a precise "on" time duration, comprising, in combination:
   a D.C. voltage supply source;
   a charge circuit including a series connection of a capacitive element, a first resistive elements, a unidirectional conducting device and switching means, the switching means opening and closing the circuit relationship of the charge circuit with the supply source, said capacitive element charging when the switching means is closed at an exponential rate according to the time constant of the charge circuit, with a train of trigger signals having a repetition rate coinciding with the opening and closing of said switching means and coinciding with the current of the charge circuit appearing across the first resistive element and establishing an electrical potential;
   a discharge circuit including a second resistive element and a second unidirectional conducting device electrically connected in series and across the capacitive element, said second unidirectional conducting device being reverse-biased in relationship to the supply source when the switching means closes the charge circuit, said discharge circuit substantially completely discharging the capacitive element when the switching means opens the charge circuit;
   a solid state trigger network adapted to receive the train of trigger signals, the trigger circuit having a predetermined trigger level and providing a train of "on-off" output signals, the time duration of the "on" portion of the output signal coinciding with the time duration that the magnitude of the trigger signals exceeds the trigger level, and the time duration of the "off" portion of the output signal coinciding with the time duration that the magnitude of the trigger signals is less than the trigger level;
   a third unidirectional conducting device joining the input of the trigger network, the third unidirectional conducting device providing a unidirectional path to the trigger network;
   variable means for tapping off a portion of the electrical potential across the first resistive element and providing a train of trigger signals to the trigger circuit, said variable means joining the third unidirectional conducting device, the variable means providing an adjustment for the magnitude of the trigger potential in relationship to the trigger level of the trigger circuit, whereby the variable means may be preset according to the precise desired "on" time duration of the output pulses.

3. A solid state control circuit in accordance with claim 2 including a control gate having a base element, a collector element and an emitter element with the collector and emitter elements connected across the switching means and the base element connected to the output of the control circuit by way of a feedback path.

4. A solid state control circuit for providing a train of output pulses having a precise "on" time duration and in which the input signals to the control circuit is a train of pulse signals comprising, in combination:

a D.C. voltage supply source;

a current control gate having a base and an emitter-collector circuit, one side of the emitter-collector circuit extending to the supply source;

a charge circuit including a series connection of a capacitive element, a first resistive element and a first unidirectional conducting device, said charge circuit extending in series with the other side of emitter-collector circuit of the control gate and supply source, the control gate controlling the direct current through the charge circuit, said control gate interrupting the current through the charge circuit according to a control signal on said base element, said capacitive element charging at an exponential rate according to the time constant of the charge circuit, with a train of trigger signals having a repetition rate coinciding with the interrupting rate of said control gate and coinciding with the current of the charge circuit flowing through the first resistive element and establishing an electrical potential;

a discharge circuit including a second resistive element and a second unidirectional conducting device electrically connected in series and across the capacitive element, said second unidirectional conducting device being reverse-biased in relationship to the supply source when the current control gate conducts, said discharge circuit substantially completely discharging the capacitive element when the control gate ceases to conduct;

a solid state trigger network adapted to receive the train of input trigger signals, said trigger network having a predetermined trigger level and providing a train of "on-off" output signals, the time duration of the "on" portion of the output signal coinciding with the time duration that the magnitude of the trigger signals exceeds the trigger level, and the time duration of the "off" portion of the output signal coinciding with the time duration that the magnitude of the trigger signals is less than the trigger level;

a third unidirectional conducting device joining the input of the trigger network, the third unidirectional conducting device providing a unidirectional path to the trigger network;

a variable means for tapping off a portion of the potential across the first resistive element and providing a train of trigger signals to the trigger circuit, said variable means joining the third unidirectional conducting device, the variable means providing an adjustment for the magnitude of the trigger potential in relationship to the trigger level of the trigger network, whereby the variable means may be preset according to the precise desired "on" time duration of the output pulses;

means for applying the input pulse signal to the trigger circuit, whereby the trigger signal conducts upon receiving the pulse signal; and feedback means connected between the output of the trigger circuit and the base element of the control gate, whereby the conduction of the control gate is controlled according to the feedback signal on the base element.

5. A solid state control circuit for providing a train of output pulses having a precise "on" time duration, comprising, in combination:

(a) a D.C. voltage supply source;

(b) a charge circuit including a series connection of a capactive element, a first resistive element, and switching means, the switching means opening and closing the circuit relationship of the charge circuit with the supply source, said capacitive element charging when the switching means is closed at an exponential rate according to the time constant of the charge circuit, with a train of trigger signals having a repetition rate coinciding with the opening and closing of said switching means and coinciding with the current of the charge circuit appearing across the first resistive element and establishing an electrical potential;

(c) a discharge circuit connected across the capacitive element, said discharge circuit substantially completely discharging the capacitive element when the switching means opens the charge circuit;

(d) a solid state trigger network adapted to receive the train of trigger signals, the trigger circuit having a predetermined trigger level and providing a train of "on-off" output signals, the time duration of the "on" portion of the output signal coinciding with the time duration that the magnitude of the trigger signals exceeds the trigger level, and the time duration of the "off" portion of the output signal coinciding with the time duration that the magnitude of the trigger signals is less than the trigger level;

(e) conducting means connecting said timing network to said trigger network so as to conduct said trigger signals appearing across said first resistive element to said trigger network;

(f) a first unidirectional conducting device in said conducting means joining the input of the trigger network, the first unidirectional conducting device providing a unidirectional path to the trigger network; and (g) means for maintaining temperature stability, said means including a second unidirectional conducting device in said charge circuit, the resistance of said first unidirectional conducting device deviating with temperature at a rate substantially corresponding to that of said second unidirectional conducting device.

6. A solid state control circuit for providing a train of output pulses having a precise "on" time duration, comprising, in combination:

(a) a D.C. voltage supply source;

(b) a charge circuit including a series connection of a capacitive element, a first resistive element, and switching means, the switching means opening and closing the circuit relationship of the charge circuit with the supply source, said capacitive element charging when the switching means is closed at an exponential rate according to the time constant of the charge circuit, with a train of trigger signals having a repetition rate coinciding with the opening and closing of said switching means and coinciding with the current of the charge circuit appearing across the first resistive element and establishing an electrical potential;

(c) a discharge circuit connected across the capacitive element, said discharge circuit substantially completely discharging the capacitive element when the switching means opens the charge circuit;

(d) a solid state trigger network adapted to receive the train of trigger signals, the trigger circuit having a predetermined trigger level and providing a train of "on-off" output signals, the time duration of the "on" portion of the output signal coinciding with the time duration that the magnitude of the trigger signals exceeds the trigger level, and the time duration of the "off" portion of the output signal coinciding with the time duration that the magnitude of the trigger signals is less than the trigger level;

(e) conducting means connecting said timing network to said trigger network so as to conduct said trigger signals appearing across said first resistive element to said trigger network;

(f) a first unidirectional conducting device in said conducting means joining the input of the trigger network, the first unidirectional conducting device providing a unidirectional path to the trigger network; and (g) a control gate having a base element, a collector element and an emitter element with the collector and emitter elements connected across the switching means and the base element connected to the output of the control circuit by way of a feedback path.

References Cited

UNITED STATES PATENTS

| | | | |
|---|---|---|---|
| 2,923,863 | 2/1960 | Chesson et al. | 307—293 XR |
| 3,376,431 | 4/1968 | Merrell | 307—229 |
| 2,949,545 | 8/1960 | White | 307—88.5 |
| 3,021,435 | 2/1962 | Keiper et al. | 307—88.5 |
| 3,181,014 | 4/1965 | Clark | 307—88.5 XR |
| 3,282,631 | 11/1966 | Mosinski | 307—88.5 |
| 3,286,200 | 11/1966 | Foulger | 332—1 |
| 3,314,062 | 4/1967 | Pommerening | 340—347 |
| 3,316,490 | 4/1967 | Jones et al. | 328—58 |
| 3,204,153 | 8/1965 | Tygart | 317—148.5 |

DONALD D. FORRER, Primary Examiner

STANLEY D. MILLER, Assistant Examiner

U.S. Cl. X.R.

307—293; 328—58, 129